United States Patent [19]

Richardson et al.

[11] Patent Number: 4,583,318
[45] Date of Patent: Apr. 22, 1986

[54] APPARATUS AND METHOD FOR DIRECT APPLICATION OF TREATMENT LIQUID TO GROWING VEGETATION

[76] Inventors: John W. Richardson; John S. Richardson, both of Rte. 3, Box 81, Colfax, La. 71417

[21] Appl. No.: 493,263

[22] Filed: May 10, 1983

[51] Int. Cl.[4] .................... A01C 00/00; B05C 1/00; B05B 15/00
[52] U.S. Cl. ...................... 47/1.5; 47/1.7; 239/542; 118/204
[58] Field of Search ............ 47/1.5, 1.7, 57.5; 118/204, 211, 219, 220, 221; 239/542; 220/249, 250, 403, 420, 386, 526; 119/157

[56] References Cited

U.S. PATENT DOCUMENTS

| | | | |
|---|---|---|---|
| 925,510 | 6/1909 | Ritchie et al. | 137/329.03 |
| 1,050,712 | 1/1913 | Applegate | 119/157 |
| 1,080,037 | 12/1913 | Wright | 119/157 |
| 1,151,883 | 8/1915 | Jones | 119/157 |
| 1,188,161 | 6/1916 | Duckham | 119/157 |
| 2,323,217 | 6/1943 | Graf | 222/403 |
| 3,002,319 | 10/1961 | Laughlin | 47/57.5 |
| 3,077,701 | 2/1963 | Osmun | 47/1.5 |
| 3,152,353 | 10/1964 | Cravener | 401/219 |
| 3,183,887 | 5/1965 | Derderian | 118/211 X |
| 3,232,006 | 2/1966 | Atherton et al. | 47/1.5 |
| 3,584,787 | 6/1971 | Thomason | 239/121 |
| 4,019,278 | 4/1977 | McKirdy | 47/1.5 |
| 4,168,798 | 9/1979 | Moore | 239/121 |
| 4,265,048 | 5/1981 | Schepers et al. | 47/1.5 |
| 4,273,285 | 6/1981 | Scholbrock | 239/121 |
| 4,285,160 | 8/1981 | Barton | 47/1.5 |
| 4,310,988 | 1/1982 | Porter | 47/1.5 |
| 4,332,107 | 1/1982 | Reed | 47/1.5 |
| 4,349,988 | 9/1982 | Kotula et al. | 47/1.5 |
| 4,359,188 | 11/1982 | Moore | 239/121 |
| 4,377,920 | 3/1983 | Bowman | 47/1.5 |
| 4,425,736 | 1/1984 | McClure et al. | 47/1.5 |
| 4,438,592 | 3/1984 | Myers | 47/1.5 |

FOREIGN PATENT DOCUMENTS

| | | | |
|---|---|---|---|
| 0058611 | 8/1982 | European Pat. Off. | 47/1.5 |
| 1100945 | 9/1955 | France | 47/1 |
| 2083732 | 3/1982 | United Kingdom | 47/1.5 |

OTHER PUBLICATIONS

Laboratory Teachings in Practical Chemistry, C. L. Bloxam, Philadelphia, Lindsay and Blakiston, p. 35, 1879.
The Analytical Chemist's Assistant, F. Woehler, Philadelphia, Henry Carey Baird, p. 33, 1852.
Advertisement "For Five Dollars an Acre, Roundup Beats Hoe Hands Down", *Progressive Farmer*, Monsanto Company, No. RUP-2-112, Jun., 1982.
Brochure, "How to Build a Pipewick Wiper", Monsanto Agricultural Products Company, publication RUP-82-D04, 1982.
Advertisement "The Super-7", Century Engineering, *FIN*, Jun. 1982, p. 12.
Advertisement "The New Auto-Tilt", The KBH Corporation, *FIN*, Jun. 1982, p. 26.
McDonald, Dale, "For Summer Weed Control: A New Breed of Selective Applicators", *FLN*, Jun. 1982, pp. 4-7.

*Primary Examiner*—Robert E. Bagwill
*Assistant Examiner*—D. Neal Muir
*Attorney, Agent, or Firm*—Cushman, Darby & Cushman

[57] ABSTRACT

An applicator unit is moved through a field of growing vegetation, for instance as an implement mounted across the front of a farm tractor. The unit includes a horizontal, laterally extending outlet manifold ranked above a similarly arranged inlet manifold. Between each manifold a plurality of forwardly convex knee-like rod members are mounted. In use, a treatment liquid to be directly applied to vegetation is arranged to run out of the outlet manifold in a superficial sheet along the surface of each rod. As vegetation is grazed by the rods, some of the treatment liquid is wiped onto the vegetation. Any treatment liquid which is not thus wiped onto vegetation is collected from the lower ends of the rods into the inlet manifold and pumped back up to a reservoir from which it flows to the outlet manifold. By preference each knee-like rod is disposed at an incline as seen in front elevation in order to decrease the chance that a tall thin plant can pass untreated between two adjacent rods. A valving system is provided to prevent air entry on inlet side of the pump.

22 Claims, 5 Drawing Figures

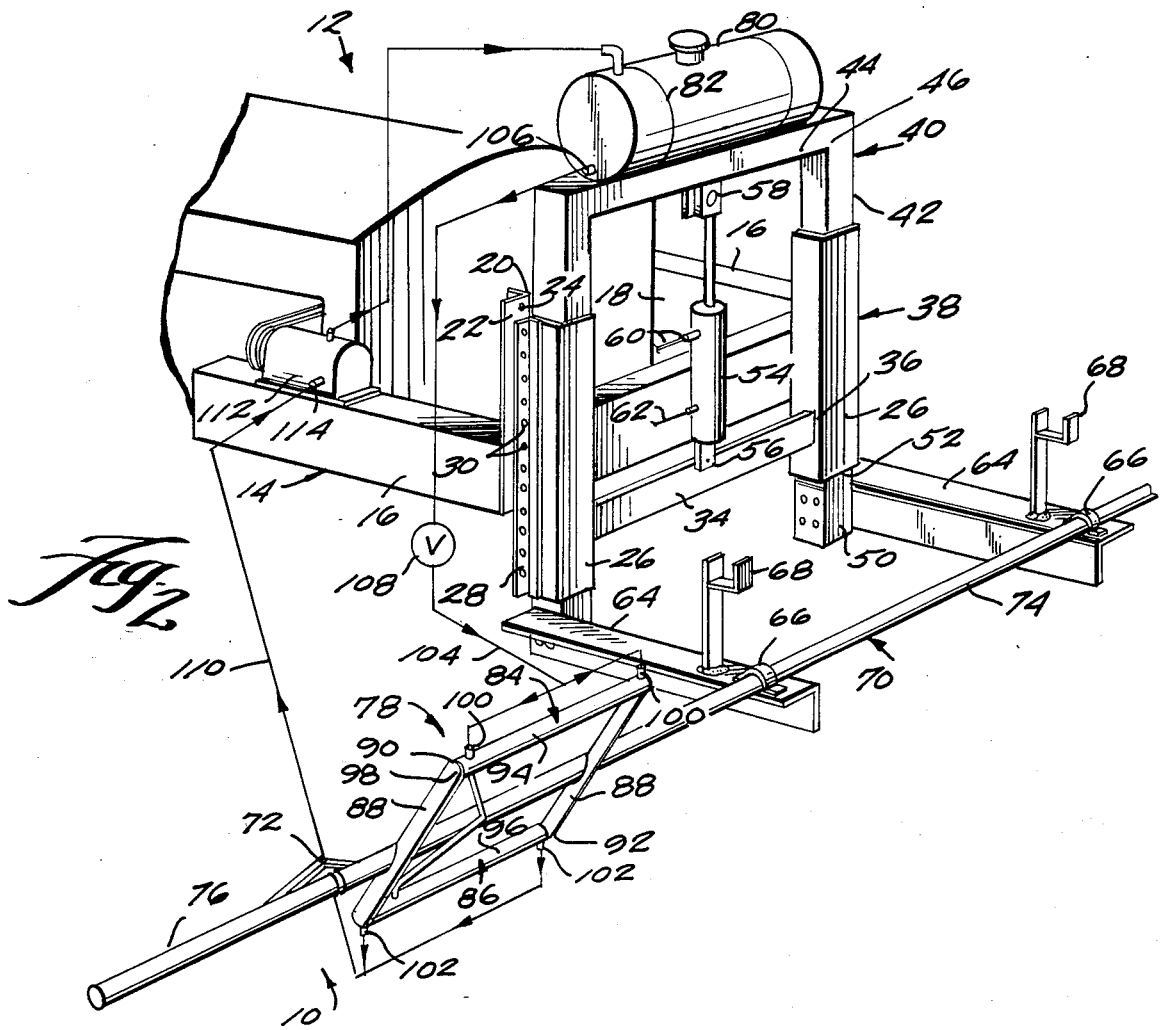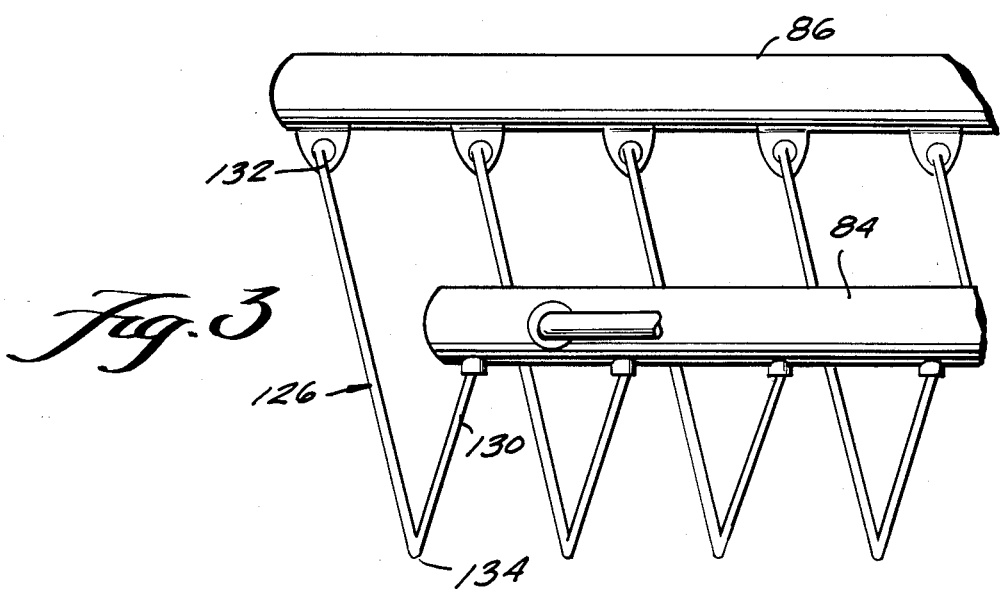

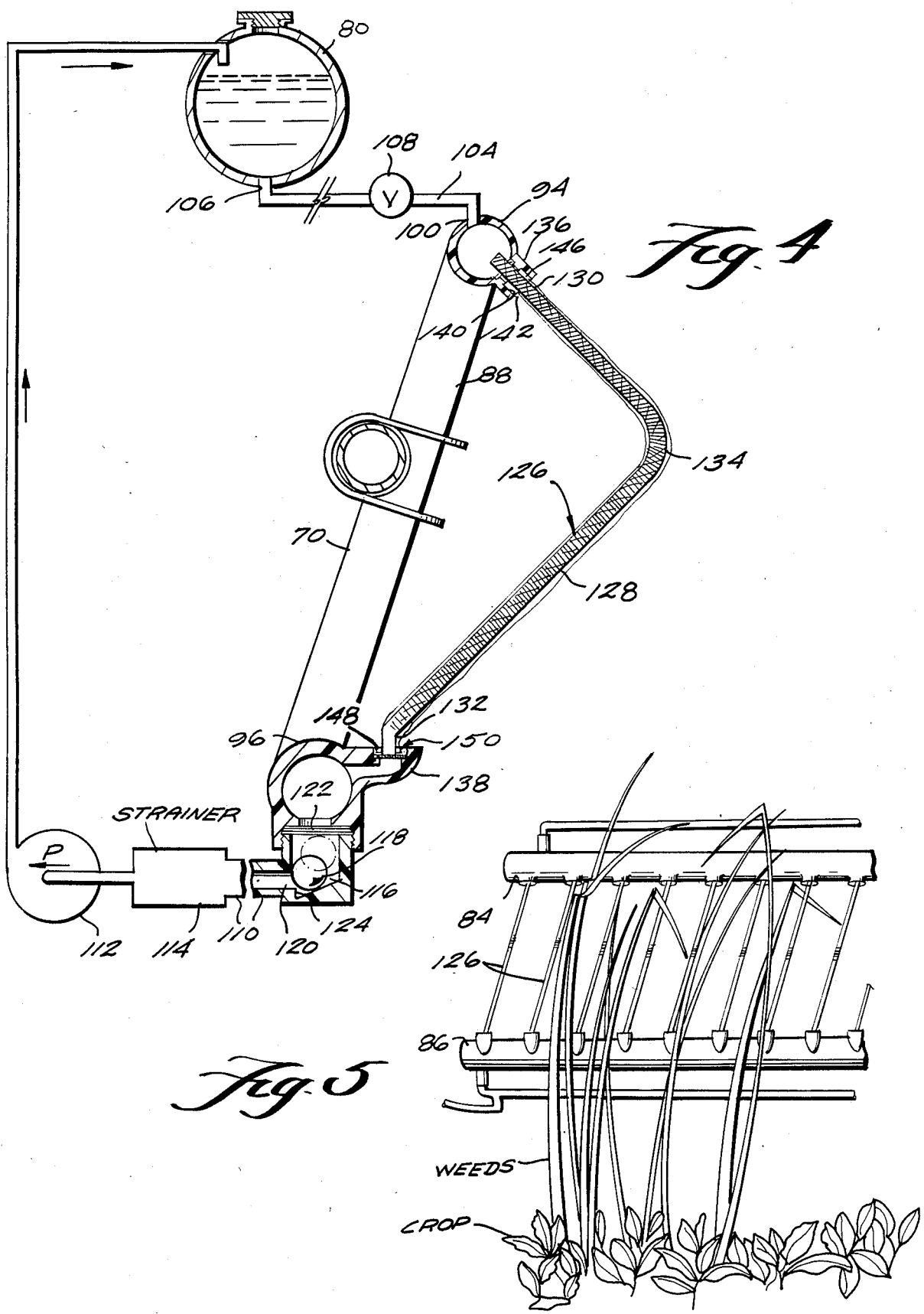

APPARATUS AND METHOD FOR DIRECT APPLICATION OF TREATMENT LIQUID TO GROWING VEGETATION

BACKGROUND OF THE INVENTION

The invention arose from a need perceived by the inventors for providing an improved device for directly applying chemical treatment liquids such as herbicides to growing vegetation in the field. An object is to avoid numerous problems such as spray drift, chemical dripping and expensive waste which are associated with conventional ways and means for treatment liquid application, such as spraying, mopping, wiping, fogging and the like.

The principles of the invention clearly have a strong potential for use outside the sector of application of agricultural herbicides, pesticides and similar chemical treatment liquids. However, the present inventors are most familiar with application of chemical treatment liquids in an agricultural context and so have chosen to describe the invention principally in relation thereto.

Accordingly, a description of ways and means conventionally used at present for applying agricultural chemical treating liquids to growing vegetation follows:

SPRAY SYSTEMS

There is a wide variety of spray equipment available for spraying chemical mixtures on vegetation for control of unwanted vegetation, fungus, insects, and other pests. Such equipment usually consists of a chemical reservoir, pressure pump, and spray nozzle arrangement connected with suitable hose, control valves, and mechanical support to direct the spray on target vegetation or surface. Spray equipment may be hand carried, towed on trailing implements, or mounted on trucks, tractors, or other self-propelled carriers.

Advantages:
1. Easy to set up.
2. Simple to operate.
3. Easily calibrated to control "overall" application rate.

Disadvantages:
1. Excessive waste. Chemical which misses the target surface is lost and unrecoverable.
2. When the system is "on" it sprays continuously with no ability to selectively place chemical where it is needed. I.e., a six row system, for herbicide spray, will spray all six rows whether weeds are present on only one or all six.
3. Spray has a high tendency to drift due to free dispersion of particles in the air. This results in exposure of non-target vegetation to damage. It also increases the risk of personnel contact with the chemical.
4. The waste from misdirected and drifted chemical is a source of atmospheric and waterborne pollution.

MOP OR WIPING BARS

During the past few years a number of variations of so-called mop bars have been marketed for application of herbicides. Such units typically consist of a long tubular bar which serves as a reservoir mounted on a farm tractor transverse to the direction of travel. The bar is fitted with a sponge or wicking material which is connected via some suitable conduit to the tubular reservoir. The chemical is then drawn from the reservoir by the wicking action of the sponge or wick. As the unit moves through the field the sponge or wick contacts weeds or grasses extending above the height of the cultivated crop. A translocating chemical is typically used which is taken into the plant leaves and is distributed through the plant with sap flow.

These systems provide useful results when conditions for use are favorable.

Advantages:
1. No drift.
2. Selective application, can be run above crop to get protruding weeds, or with specially design units, run in row "middle" to get weeds below crop foilage overlapping the "middle".

Disadvantages:
1. The wick surface must be essentially saturated to permit liquid to wipe onto the weed and grass. Even at saturation using the best wicking materials available, good weed kills are difficult to achieve.
2. When wicking surfaces are saturated to the point of impending drip, any additional overapplication of chemical can cause dripping and crop damage.
3. When wick is saturated the air flow from movement through the field causes high evaporation rates and excessive waste.
4. Many methods of controlling flow to the wick or reservoir have been tried but to the inventors' knowledge no really successful method has been found. Thus, controlling wick saturation is a major problem.

ATOMIZER, MIST, OR FOGGING SYSTEMS

New application systems are being introduced which employ a disc rotating at high speeds in a horizontal plane onto which chemical is fed. The chemical mixture is broken up into very small particles and dispersed as a mist over a relatively large area. These units may use oil or other liquid mixed with the chemical to aid distribution. The disc is specially designed with suitable vanes, surface conditions, etc., to achieve desired results.

Advantages:
1. Fine mist of chemical is more efficient than spray since it achieves more uniform coverage.

Disadvantages:
1. As with spraying the chemical cannot be selectively applied.
2. Mist is susceptible to drift.
3. Area of coverage is difficult to control.
4. Exposure of operator to chemical contact is difficult to control.

SUMMARY OF THE INVENTION

An applicator unit is moved through a field of growing vegetation, for instance as an implement mounted across the front of a farm tractor. The unit includes a horizontal, laterally extending outlet manifold ranked above a similarly arranged inlet manifold. Between each manifold a plurality of forwardly convex knee-like rod members are mounted. In use, a treatment liquid to be directly applied to vegetation is arranged to run out of the outlet manifold in a superficial sheet along the surface of each rod. As vegetation is grazed by the rods, some of the treatment liquid is wiped onto the vegetation. Any treatment liquid which is not thus wiped onto vegetation is collected from the lower ends of the rods into the inlet manifold and pumped back up to a reservoir from which it flows to the outlet manifold. By preference each knee-like rod is disposed at an incline as seen in front elevation in order to decrease the chance that a tall thin plant can pass untreated between two adjacent rods. A valving system is provided to prevent air entry on the inlet side of the pump.

The priniciples of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the drawings:

FIG. 2 is an enlarged fragmentary perspective view of the apparatus of FIG. 1;

FIG. 3 is a fragmentary top plan view of the applicator;

FIG. 4 is a somewhat schematic cross-sectional view of the applicator showing the circulation path of the liquid treatment agent; and FIG. 5 is an enlarged fragmentary front elevation view showing direct application of treatment liquid to the foliage of a tall clump of grass passing between two bars of the apparatus over a field of lower crop vegetation.

DETAILED DESCRIPTION

Figure 1:
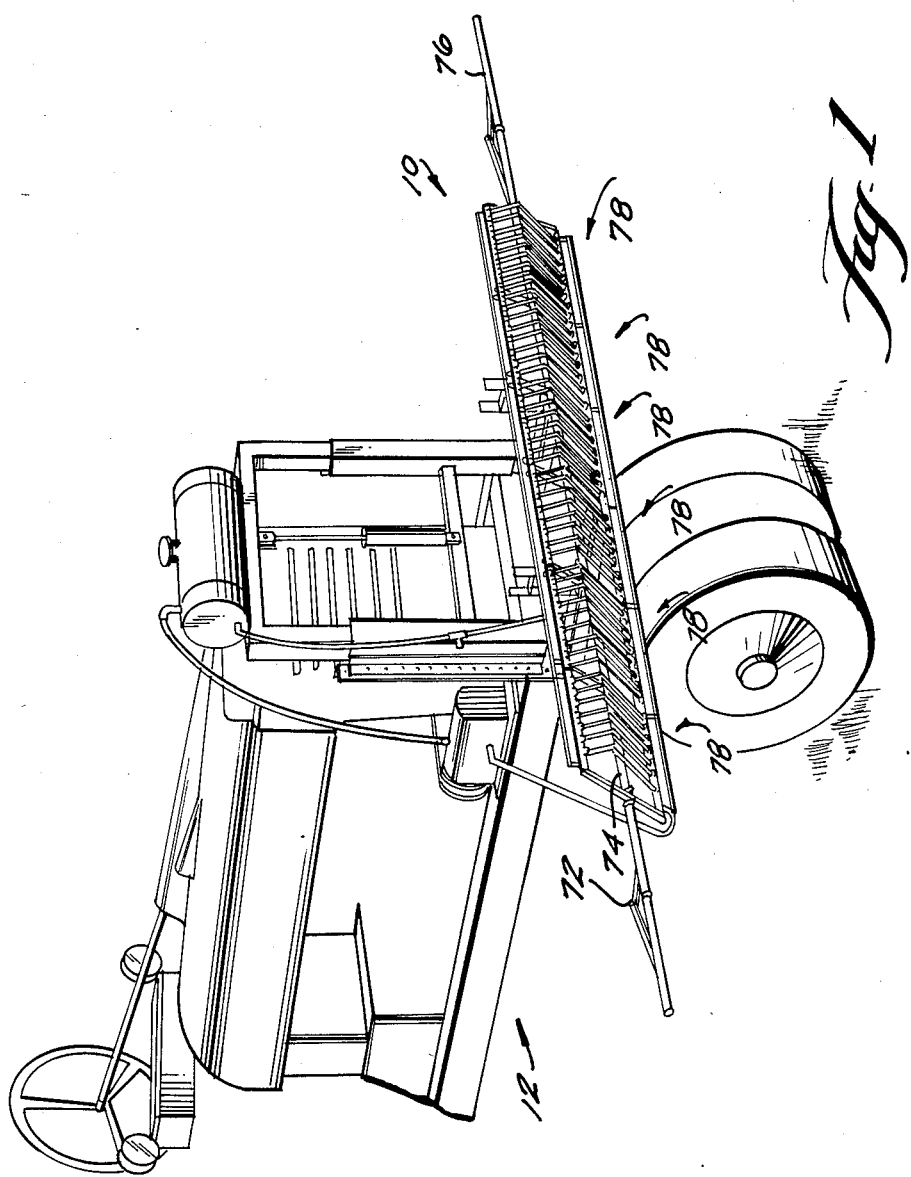
FIG. 1 is a perspective view of a farm tractor having the apparatus of the invention mounted horizontal, transverse boom-fashion to the front.

In FIGS. 1 and 2, the applicator apparatus 10 of the invention is shown mounted to a conventional farm tractor 12. To that end, the front of the tractor frame is shown provided with a mounting frame 14 including two laterally spaced, forwardly projecting horizontal box channels 16 which are bolted at their rear ends to the tractor frame at 18. At their forward ends, the two mounting frame channels 16 are shown provided with vertically extending right angle channels 20 each having a flange 22 provided with a vertically extending series of holes 24.

The device 10 is shown further including a pair of transversally spaced, vertically oriented box channels 26, each of which is shown provided with a laterally projecting flange 28 having a vertically extending series of holes 30 through it. The holes 30 have the same hole-to-hole spacing as the holes 24. Accordingly, both frame elements 26 can be bolted at 32 to the frame elements 20 at any of a plurality of selected different heights.

The frame elements 26 are fixedly joined so as to form a rigid unit, by a transversally extending bar 34 which is welded or otherwise secured at each end 36 to the respective frame elements 26, thus constituting an H-shaped base frame 38 which normally remains stationary with regard to the tractor, except when raised or lowered using the bolt and hole adjustment system 22, 24, 28, 30, 32.

The exemplary mechanical mounting for the device 10 is shown further including an inverted U-shaped movable frame member 40, including two vertical legs 42 made of box channel elements, and an upper crossbar element 44 rigidly secured at its opposite ends 46 to the upper ends of the legs 42. The legs 42 are somewhat longer than the box channels 26 of the base frame, in the longitudinal bores 48 of which they are vertically slidingly received. Accordingly a lower portion 50 of each leg 42 projects below the lower end 52 of each respective base frame box channel 26.

The movable frame 40 is shown height adjustably mounted to the base frame 38 by a vertically oriented extensible/retractable hydraulic piston and cylinder unit 54 having one end centrally mounted on the base frame crossbar 34 at 56 and its other end centrally mounted on the crossbar 44 of the movable frame member 40 at 58. Control lines 60, 62 lead from the unit 54 to the conventional hydraulic system of the tractor, and include control means (not shown) provided at the tractor operator's control station which if manipulated in one sense or the other cause the hydraulic piston and cylinder unit to raise or lower the movable frame with respect to the base frame and which when left alone maintain the movable frame at the last-selected level.

The exposed lower end portions 50 of the legs 42 are shown provided with respective short, forwardly projecting horizontal bars 64. Each of these bars 64 towards its forward end mounts a U-bolt 66 and intermediate its length is shown rigidly mounting an upwardly projecting yoke bracket 68.

The device 10 is shown further including a transversally horizontally extending mechanical boom 70 which typically is several feet wide. This boom 70, which typically is made of steel pipe, may include a pair of hinges 72 which divide its lateral extent into a central portion 74 and two wing portions 76, so that for travel to and from the field that is to be treated, the effective width of the tractor 12 with the device 10 can be substantially lessened by folding the boom 70 about its hinges 72. The yoke brackets 68 are provided for supporting the boom wings 76 when the boom 70 is folded.

The apparatus as described to this point mainly is constituted by exemplary means for mounting the important working parts of the device 10 to a tractor 12 or other mobile vehicle so that it may be effectively moved through the field of growing vegetation which is to be subjected to treatment in accordance with the principles of the present invention. To this end, one or more applicator units 78 are shown mounted to the boom 70. In the instance depicted, there are six identical applicator units 78 placed adjacent one another in a series extending across the full width of the boom, e.g. with four on the central section of the boom and one on each boom wing.

A reservoir for treatment liquid is shown provided in the form of a tank 80 mounted at 82 on the crossbar 44 of the movable frame 40.

Each applicator unit 78 is shown including an upper, transversally extending, horizontal outlet manifold 84 and a lower, transversally extending, horizontal inlet manifold 86.

A plurality of generally vertically extending mounting brackets 88 are shown mounted to the boom about half-way up their vertical extent. Each preferably is correspondingly inclined somewhat from vertical so that its upper end lies ahead of its lower end. The upper end 90 of each bracket 88 mechanically mounts a corresponding end of an upper, outlet manifold 84 and the lower end 92 of each bracket 88 mechanically mounts a corresponding end of a lower, inlet manifold 86.

Each manifold 84, 86 is a tubular body 94, 96 having its opposite ends plugged as at 98.

Each outlet manifold 94 is shown provided near its opposite ends at the top with respective inlet fittings 100. Each inlet manifold 96 is shown provided near its opposite ends at the bottom with respective outlet fittings 102.

The inlet fittings 100 are connected via tubing 104 to an outlet fitting 106 provided at the bottom of the reservoir tank 80. A valve means 108 is provided in the tubing 104 between the tank 80 and the outlet manifolds 94. Accordingly, gravity feed of liquid treatment chemical from the tank to the applicator units can be increased, reduced or shut off by regulating the valve means 108. The valve means 108 may be constituted by one or more manually operated valves, solenoid valves remotely operable from the tractor operator's work station, or the like.

The outlet fittings 102 are connected via tubing 110 to the top of the reservoir tank 80. A pump 112, e.g. a diaphragm pump run off the tractor's power system is shown incorporated in the tubing 110, with its suction side oriented towards the inlet manifolds 96 and its pressure side oriented towards the reservoir tank 80. Accordingly, in operation, the pump 112 functions to circulate treatment liquid collected in the inlet manifolds 96 back to the reservoir tank 80 for gravity feed to the outlet manifolds 94. A conventional strainer unit 114 with a clean-out trap may be incorporated in the tubing line 110 upstream of the pump to prevent debris collected in the recirculating treating liquid from fouling the pump or collecting in the reservoir tank.

Each outlet fitting 102 from a respective inlet manifold 96 comprises an air trap having a sump 116 housing a float ball 118 between a lower outlet 120 and an upper, perforated ball retainer inlet 122 interfaces with the interior of the respective inlet manifold 96. Accordingly, when an appreciable amount of liquid is draining from the inlet manifold into the sump, the ball floats and the outlet 120 is open to the suction side of the pump. However, when not much liquid is draining into the sump, the ball 118 seals the outlet 120 at the seat 124 to prevent the pump from drawing air into its inlet.

This condition would typically occur at the elevated end of the inlet manifold when the supporting vehicle is tipped to one side on unlevel terrain. By preventing air flow to the pump, full suction is maintained to sump locations where liquid is present, eliminating the possiblity of liquid spillage.

The direct application of treatment liquid to the growing vegetation is accomplished by means of a plurality of applicator bars 126. Each applicator bar preferably is constituted by a rod, e.g. made of steel, synthetic plastic such as polyvinyl chloride or the like. Each rod 126 is oriented generally vertically and is communicated between an outlet manifold 94 and an inlet manifold 96 in such a manner that treatment liquid in the outlet manifold forms a falling sheet on the outer surface 128 of the rod 126. Then, as the device 10 is moved through the field of growing vegetation, if the rod 126 brushes against the leaves or stem of a plant, some of the treating liquid which is descending that rod is wiped directly onto that particular vegetation. To the extent that no vegetation wipes against the rod, and/or an excess of treating liquid is flowing down the outside of the rod, the excess runs from the lower end of the rod, into the inlet manifold where it is collected, runs into the sumps 116 and is pumped back to the reservoir tank 80.

By preference, each applicator rod 126 is oriented at a left to right slant as seen in front elevation, so that its upper and lower ends 130, 132 are not in vertical alignment. Likewise by preference, the upper end 130 of each rod 126 is located somewhat forwardly of its lower end 132. Further by preference, each applicator rod 126 is bent between its ends so as to be generally convex forwards, e.g. so as to have a knee bend 134 disposed about one-third of the distance down each applicator rod 126 from the top.

The external surface 128 of each applicator rod preferably is knurled in a diamond pattern created by cutting opposite hand-patterns of helical grooves in the applicator rods. Each diamond typically is one-sixteenth of an inch wide and three-thirtysecondths of an inch long.

Typically, the manifolds 94, 96 are one inch and one and a half inches in diameter, respectively, with ten inches of vertical spacing between them.

At the site of each applicator rod 126, each manifold 94, 96 is provided with a respective radially outwardly directed nipple 136, 138. The nipples 136 project downwardly-forwardly, e.g. at approximately a forty-five degree angle. The nipples 138 project upwardly-forwardly, e.g. at approximately a thirty degree angle to vertical. The respective pairs of nipples 136, 138 are laterally offset sufficiently that each rod 126 inclines laterally at an angle of about twenty degrees to vertical, and the spacing between adjacent rod 126 is preferably such that the lower end of one rod is approximately vertically aligned with the upper end of its neighbor.

As shown, each outlet manifold nipple 136 is internally threaded at 140 and closed with a fitting 142 into a socket 144 of which the upper end of a respective applicator rod 126 is fixedly secured, e.g. by being threaded and/or adhesively secured into place. Generally tangent with the upper side of the surface 128 of each applicator rod, the respective fitting 142 is throughbored with a small hole 146, so that treatment liquid in the outlet manifold 94 may run down the nipples 136, out the throughbores 146 and down along the surfaces 128. The knurling pattern preferably provided on the surfaces 128 helps to keep the liquid spread circumferentially about the surfaces 128 as it falls in a superficial sheet along each respective applicator rod 126.

The lower end portion of each rod 126 may be simply telescopically received in a respective inlet manifold nipple 138. The interior diameter of each nipple 138 is preferably considerably wider than the diameter of the lower end portion of the respective rod 126, and the lower end of each rod 126 preferably is generally centralized in the respective inlet manifold nipple 138. This may easily be accomplished by providing a ring-shaped flange 148 internally circumferentially on each inlet manifold nipple, spaced somewhat down from its upper end, and having an internal diameter which still is somewhat larger than the outer diameter of the respective rod 126. Each rod extends down centrally through each annular flange 148 before terminating. Thus, each inlet manifold nipple 138 is provided with a receiver 150 for liquid running down the respective rod 126 and into the respective inlet manifold nipple, with means for preventing that liquid from running down the outside of the inlet manifold nipples.

A device 10 typically may be constructed for simultaneously treating six rows of soybeans in order to wipe with herbicide isolated clumps of Johnson grass which project several inches above the soybean plants. Thus, this device 10 may be provided with six applicator units, each forty inches wide, four mounted to the central portion of the boom, and one to each boom wing.

The applicator apparatus is adjusted at such a height that the applicator bars will miss the soybeans but brush against the Johnson grass by using the hydraulic piston and cylinder unit to raise and lower the movable frame with respect to the base frame. If the magnitude of such adjustment is insufficient the base frame itself may be moved up or down using the bolted flange adjustment described hereinabove.

The reservoir tank 80 is mounted up on the crossbar of the movable frame in order to provide a relatively constant hydrostatic pressure for gravity-feeding liquid treatment chemical to the outlet manifolds 94, and thus to the upper ends of the individual applicator bars 126. Typically, the reservoir tank 80 is of about 25-50 gallons in capacity, about 1.5 feet in diameter and about three feet long. A vertically flattened oval profile will provide a more constant hydrostatic head since there is less variation in depth as the chemical treating liquid is used up.

The treating liquid circulating pump for the apparatus 10 may be belt driven from the engine crankshaft pulley of the tractor 12, and should be equipped with a magnetic clutch or the like so that it may be stopped and started and/or regulated as to output. Alternatively the pump may be electrically, hydraulically driven or the like. Each outlet manifold preferably is fed with treating liquid from both ends and each inlet manifold preferably has excess treating liquid collected therefrom at both ends in order to insure a full-width supply and effective return even when the ground over which the tractor is moving is not level.

The compound tilted and bent disposition of the applicator rods 126 is designed to provide a combing action as the applicator apparatus 10 encounters weeds, especially grasses. The combing action produces a weaving motion of the grass and a mild wedging action which buffets the weeds into strong and extended wiping contact with two flanking applicator rods 126 so that more herbicide is run off the rods and onto the weed foliage.

If considered necessary, in addition or instead of the strainer unit which is provided ahead of the inlet side of the treatment liquid circulating pump, each receiver in each inlet manifold nipple may be provided with a strainer screen, e.g. for preventing bits of vegetation from entering the inlet manifolds.

The throughbores of the outlet manifold nipple fittings are sized to provide the desired amount of falling sheeting flow of treating liquid about the surfaces of the applicator rods 126. If considered necessary or desirable, each such throughbore may be fitted with a conventional nozzle which is adjustable for increasing and decreasing flow therethrough. Liquid flow should be such as to provide a falling film on the respective rod, without any spraying where the liquid issues from the throughbore onto the rod, and without appreciable dripping off the rod between the upper end and the receiver of the respective inlet manifold nipple. Each rod 126 typically is about one-fourth of an inch in diameter.

The apparatus of the invention, when provided and used in its preferred embodiment as described is believed to distinguish in an advantageous manner over the prior art systems described hereinabove in that, A. Transfer occurs from a free liquid surface allowing the liquid to flow freely onto the receiving surface.

B. Highly efficient use of chemicals. Chemical treatment liquid is applied only where necessary. Chemical treatment liquid is simply recirculated until contact is made with a target surface.

C. Evaporation rates are very low due to the small surface area exposed to the atmosphere by the application rods. The evaporation area is much smaller than on typical mop or wick type applicators.

D. Application can be made at any time of day. Mop or wick type applicators should be used when heavy dew is present on vegetation as a source of additional water for chemical distribution. With heavy dew present on both crop and target plant the risk of crop damage is increased. This invention, used when foliage is dry provides maximum protection of crop from chemical damage.

E. No part of the system is pressurized except for the return line to the reservoir tank, so potential for leakage is reduced and maintenance is easy.

F. The liquid flows through a complete circuit, virtually eliminating the dripping problem associated with mop- or wick-type applicators.

G. Complete absence of spray and air-suspended particles, virtually eliminates potential for drift.

H. The efficient chemical utilization and reduced potential for drift and dripping provides a significant reduction in environmental pollution.

I. The recirculating chemical system makes it possible to carry much less weight over the field, thus saving not only chemicals but also energy.

J. The invention can handle weeds both above and below the crop foliage.

K. The invention eliminates the need for control of wick saturation which exists on mop or wick type systems, making it practical to operate the present system during cultivating avoiding the need for a separate "trip" over the field. The constant problem of keeping the wick "just wet enough" so it doesn't drip is eliminated.

L. On/off flow of the system can be easily controlled from the driver's seat if desired.

Of course the above list of features relates to a use of the preferred embodiment as described hereinabove. It is possible to achieve many of the benefits of use of the invention yet forgo some of the individual benefits by departing from the preferred embodiment, within the principles of the invention.

It should now be apparent that the apparatus and method for direct application of treatment liquid to growing vegetation as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. Apparatus for directly applying treating liquid to growing vegetation in a field or the like, comprising:
    at least one generally vertically oriented applicator rod means having a substantially non-porous, exposed external surface capable of supporting a falling film of treating liquid having a free liquid surface on said substantially non-porous, exposed external surface, this at least one rod means being arranged to be moved through a field of growing vegetation at a level above ground level so as to be in position to brush said free liquid surface against such growing vegetation as is to be treated;
    a reservoir for treating liquid;
    first conduit means effectively extending from said reservoir to the vicinity of the respective said external surface of each said applicator rod means, with such juxtaposition as to flow treating liquid onto said external surface without substantial splashing or spraying;

upwardly opening collecting trough means effective spacedly enclosingly receiving a lower end portion of each said rod means for collecting as drainage therefrom substantially all of such of the treating liquid as has run down the external surface of that rod means without having been removed therefrom by brushing against growing vegetation;

second conduit means communicated with said collecting trough means for recovering collected treating liquid from said collecting trough means;

and pumping means effectively incorporated in the circuit including the reservoir, the first conduit means, said external surface of each said rod means, the collecting trough means and the second conduit means for forwarding treatment liquid along at least one segment of said circuit.

2. The apparatus of claim 1, wherein:
said pumping means is incorporated in said second conduit means.

3. The apparatus of claim 2, wherein:
flow from said reservoir through said first conduit means and into said bar external surface is by gravity feed.

4. The apparatus of claim 1, wherein:
said external surface of each said rod means is grooved.

5. The apparatus of claim 4, wherein:
said external surface of each said rod means is spirally-grooved in two opposed superimposed patterns to provide a pattern of diamond-shaped knurling.

6. The apparatus of claim 1, further including:
a frame means including a base frame portion adapted to be mounted to a mobile vehicle such as a farm tractor, a movable frame portion having said applicator rod means secured thereto; and
extensible/retractable support means connecting said movable frame portion with said base frame portion, whereby said applicator rod means may be raised and lowered relative to the vehicle by extending and retracting said extensible/retractable support means.

7. The apparatus of claim 6, wherein:
said pumping means is incorporated in said second conduit means, and said reservoir is mounted on said movable frame at a higher level than said applicator rod means.

8. The apparatus of claim 6, wherein:
said first conduit means includes at least one transversally extending, horizontally oriented outlet manifold having a plurality of outlet nipples spaced therealong in a series;
said collecting trough means includes a plurality of upwardly opening inlet nipples mounted and spaced in a transversally extending, horizontally oriented series;
fitting means securing an upper end portion of a respective said applicator rod means in each said outlet manifold;
a lower end portion of each respective applicator rod means being telescopically received in a corresponding said inlet nipple; and
means effectively interposed between each applicator rod means lower end portion and the inlet nipple in which that lower end portion is telescopically received for radially generally centralizing and spacing the respective applicator rod means lower end portion relative to the corresponding inlet nipple, to prevent treating liquid from running down the outside of the inlet nipples.

9. The apparatus of claim 8, wherein;
the outlet manifold is located forwardly of and at a higher level than said series of inlet nipples.

10. The apparatus of claim 9, wherein:
each outlet nipple is substantially transversally displaced from vertical alignment with the inlet nipple with which it corresponds so that the applicator rod means have a substantial lateral component to their shape in extending from said outlet manifold to said series of inlet nipples.

11. The apparatus of claim 10, wherein:
each applicator rod means has a substantial bend therein so as to be convex forwardly.

12. The apparatus of claim 11, wherein:
each such bend has a blunt apex located about one-third down the length of the respective applicator rod.

13. The apparatus of claim 8, wherein:
each said first conduit means includes a throughbore provided through each respective outlet manifold nipple fitting, such throughbore being constructed and arranged to lead treating liquid substantially tangentially onto the respective said non-porous, exposed internal surface.

14. The apparatus of claim 8, wherein:
said frame means further includes a transversally, horizontally extending boom of substantial width mounted medially to said movable frame so as to extend leftwardly and rightwardly of as well as in line with the vehicle; and
means mounting said outlet manifold and inlet nipples to said boom.

15. The apparatus of claim 14, wherein:
said boom includes hinge means whereby said boom may be substantially decreased in width by folding lateral wing portions of said boom relative to a medial portion of said boom when said apparatus is not in use.

16. A method for directly applying treating liquid to growing vegetation in a field or the like, comprising:
moving at least one externally substantially non-porous applicator rod through the field above ground level but conincident with the level of some growing vegetation in the field, while causing a film of treating liquid to flow down the external surface of each such applicator rod from a reservoir of treating liquid so as to provide a free liquid surface of said treating liquid externally on each such applicator rod;
disposing an upwardly opening collector in spacedly enclosingly receiving collecting relation to the lower end of each said applicator rod as as to collect such of said treating liquid as shall not have been removed from that applicator rod while running down its external surface; and
pumping the thus-collected treating liquid back to the reservoir.

17. The method of claim 16, wherein:
there are a plurality of such applicator rods ranked in a transversally extending series, and the movement step is conducted in such a manner that the applicator rods are both laterally and longitudinally inclined relative to the path of movement of the applicator rods along the field so that growing vegetation encountered between adjacent applicator rods is forcefully combed thereby as treating liquid is applied thereto.

18. A method for applying treatment liquid to growing vegetation, comprising:
  (a) moving at least two spacedly adjacent generally upright non-porous rods through a field of growing vegetation, at above ground level so that some of the vegetation passes between the rods and is brushed thereby;
  (b) while conducting step (a), applying sufficient treatment liquid to said rods at an upper level thereon, that the treating liquid freely runs down the exterior of said rods, in position to be brushed off onto vegetation physically touchingly encountered by said rods;
  (c) collecting at a lower level from said rods such of said treating liquid as has not been brushed off onto vegetation or otherwise been lost from the exterior of said rods; and
  (d) recycling the treating liquid collected in step (c) for reuse in conducting step (b).

19. The method of claim 18, wherein:
step (d) is conducted substantially continuously as steps (a), (b) and (c) are conducted.

20. The apparatus of claim 1, wherein:
a plurality of such applicator rod means is provided and the applicator rod means thereof are ranked in a transversally extending series;
said first conduit means includes at least one transversally extending horizontally oriented outlet manifold having a plurality of outlet nipples spaced therealong in a series;
said collecting trough means includes a plurality of upwardly opening inlet nipples mounted and spaced therealong in a transversally extending, horizontally oriented series;
each said applicator rod means having an upper end portion thereof fitted to said outlet manifold and a lower end portion thereof fitted to a respective said inlet nipple.

21. The apparatus of claim 20, further including:
an inlet manifold extending transversally, horizontally, adjacent said series of inlet nipples; each inlet nipple being constructed and arranged to empty into said inlet manifold; and
said second conduit means includes a first branch line communincated to said inlet manifold adjacent one lateral extent of said inlet manifold and a second branch line communicated to inlet manifold adjacent the opposite lateral extent of said inlet manifold;
each said second conduit means branch line incorporating a respective check valve means constructed and arranged to close for so long as treating liquid available to flow through the respective branch line remains below a threshold level, as when the apparatus while traversing laterally sloping terrain and one end of the inlet manifold is temporarily disposed substantially higher than the opposite side thereof.

22. The apparatus of claim 21, wherein:
each said check valve means is constituted by a float-to-open type ball check valve including a sump containing a respective floatable ball.

* * * * *